United States Patent [19]

Moser

[11] Patent Number: 4,719,800
[45] Date of Patent: Jan. 19, 1988

[54] ACCELEROMETER

[75] Inventor: Bernd Moser, Hamm/Sieg, Fed. Rep. of Germany

[73] Assignee: BOGE GmbH, Eitorf, Fed. Rep. of Germany

[21] Appl. No.: 864,447

[22] Filed: May 16, 1986

[30] Foreign Application Priority Data

May 22, 1985 [DE] Fed. Rep. of Germany ....... 3518383

[51] Int. Cl.⁴ .................... G01P 15/08; G01H 1/00
[52] U.S. Cl. .................... 73/517 R; 73/653; 250/231 R
[58] Field of Search ........... 73/517 R, 653, 655, 73/516 R, 499, DIG. 11; 250/231 R

[56] References Cited

U.S. PATENT DOCUMENTS

| Re. 31,416 | 10/1983 | Olsen et al. | 73/862.59 |
|---|---|---|---|
| 3,798,454 | 3/1974 | Weiss | 73/517 R |
| 3,960,009 | 6/1976 | Roepke et al. | 73/88 |
| 4,104,921 | 8/1978 | Nissl | 73/517 R |
| 4,118,977 | 10/1978 | Olsen et al. | 73/141 |
| 4,239,963 | 12/1980 | August et al. | 73/517 R |
| 4,321,464 | 3/1982 | Miller | 73/655 |
| 4,471,451 | 9/1984 | Schenck | 364/605 |
| 4,477,732 | 10/1984 | Mausner | 307/9 |
| 4,531,414 | 7/1985 | Kravs | 73/653 |
| 4,558,430 | 12/1985 | Mogami et al. | 364/900 |
| 4,563,734 | 1/1986 | Mori et al. | 364/157 |

FOREIGN PATENT DOCUMENTS

| 2556298 | 6/1977 | Fed. Rep. of Germany . | |
| 422975 | 9/1974 | U.S.S.R. | 73/653 |

Primary Examiner—John Chapman
Attorney, Agent, or Firm—Nils H. Ljungman

[57] ABSTRACT

Accelerometer with an inertial mass suspended in a housing, and with apparatus for deriving a signal for the measurement of a force acting on the inertial mass. The accelerometer measurement is thereby made by means of a light source located inside the inertial mass, the light from which is transmitted through hiles in the inertial mass. The light transmitted through the holes strikes photo elements positioned on the housing. This apparatus makes possible a direct evaluation of the signals, whereby, if necessary, digital words can be produced for the determination of the position of the inertial mass within the housing. In one embodiment the inertial mass has two holes therein which transmit light to two groups of photo elements.

18 Claims, 7 Drawing Figures

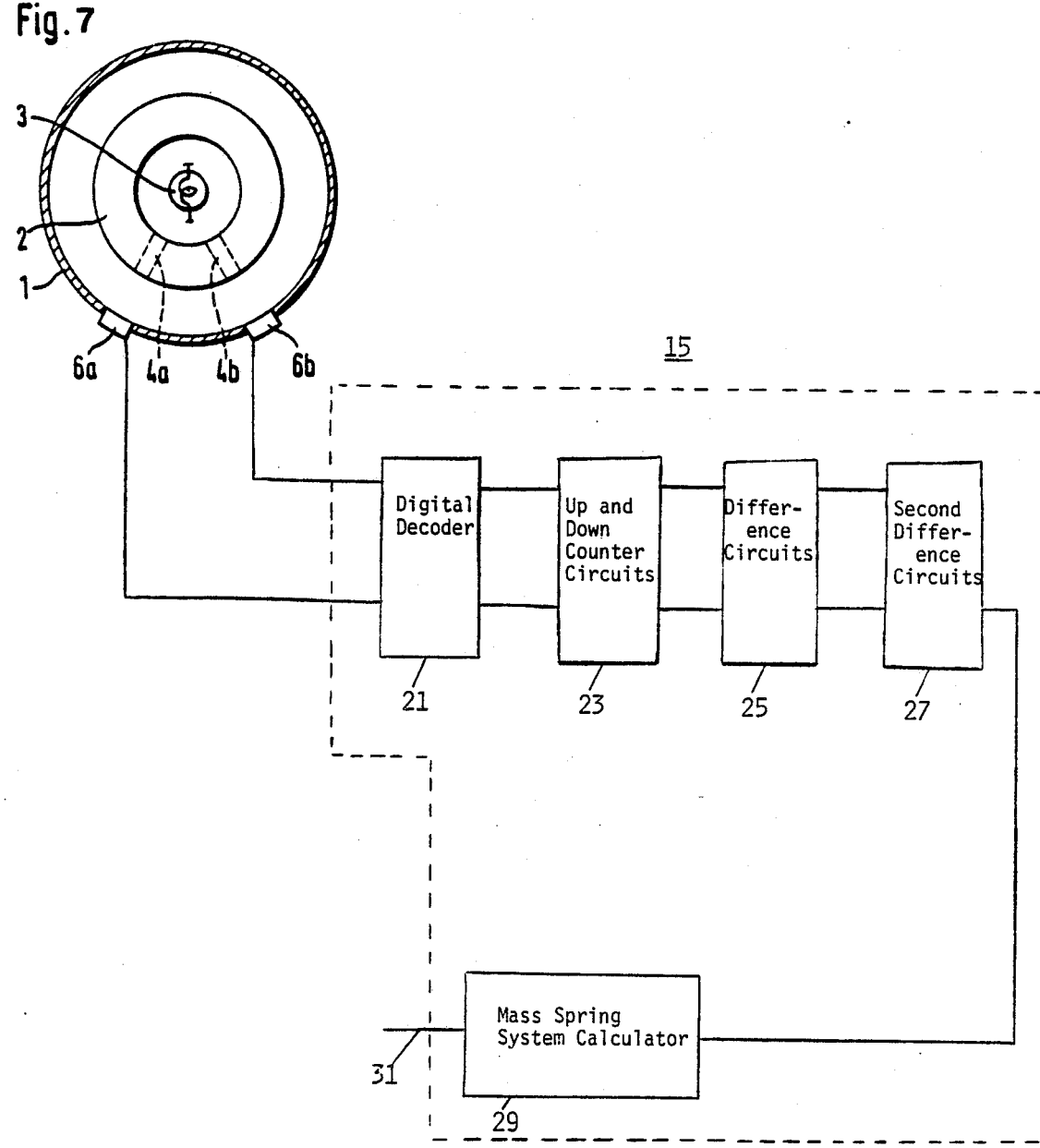

ACCELEROMETER

CROSS REFERENCE TO CO-PENDING APPLICATION

Co-pending Application Ser. No. 864,452, filed on May 16, 1986, entitled "Vehicular Suspension System", corresponding to Federal Republic of Germany Patent Application No. P 35 18 382.9-52, filed on May 22, 1985, is assigned to the same assignee as the instant application.

BACKGROUND OF THE INVENTION

1. Field of the Invention

The invention relates to an accelerometer with an inertial mass suspended in a housing, and an apparatus for the measurement of a force acting on the inertial mass.

2. Description of the Prior Art

The prior art includes accelerometers, such as in German Pat. No. DE-PS 26 24 884, in which, for the measurement of the force, two opposite reflecting surfaces form a gap, whose enclosed angle can be modified by a force acting on the inert mass. As a result of a change in the gap angle, the number of reflections changes, as well as the angle of reflection, measured toward the reflecting surface, of a beam of light emitted from the light source at a determined angle, and thus the intensity of the light which falls into the light inlet opening. Such a measurement is difficult and expensive, and cannot be used without further modification on all parts of the vehicle, since it is susceptible to interference and quite sensitive.

In other accelerometers of the prior art, for example, U.S. Pat. No. 4,104,921, entitled "Piezoelectric Acceleration Transducer", which corresponds to German Laid Open Patent Application No. DE-OS 25 56 298, the inertial mass acts on a piezo-element when an acceleration force occurs. The resulting piezo-electric charge is measured, and is used as a measurement for the acceleration force which is present. In practice, it has been shown that ordinary piezo-ceramics exhibit irregular and uncontrolled behavior as a function of temperature and aging effects. Overall, such piezo-electric accelerometers are very cost-intensive and difficult to use in technological applications.

The prior art also includes pure accelerometers, such as in German Pat. No. DE-PS 26 24 884, in which, for the measurement of the force, two opposite reflecting surfaces form a gap, whose enclosed angle can be modified by a force acting on the inert mass. As a result of a change in the gap angle, the number of reflections changes, as well as the angle of reflection, measured toward the reflecting surface, of a beam of light emitted from the light source at a determined angle, and thus the intensity of the light which falls into the light inlet opening. Such a measurement is difficult and expensive, and cannot be used without further modification on all parts of the vehicle, since it is susceptible to interference and quite sensitive.

Another example of the proir art is U.S. Pat. No. 4,477,732, entitlted "Sensor For Acceleration", which has a first photoconductor disposed in a suspended body. This first photoconductor leads light into the body from an outside light source. The light is then conducted to each of three additional photoconductors when each is aligned with the first photoconductor as the body moves within a housing. At the end of each of the three additional photoconductors there is connected a photo element which converts the light falling thereon to an electrical signal which is connected into an acceleration-related signal.

All of the afore-mentioned patents are incorporated herein by reference as if fully set forth herein in their entirety.

OBJECTS OF THE INVENTION

An object of the invention is the creation of a simple, cost-effective accelerometer which is mechanically sturdy.

It is a further object of the invention provide an accelerometer which is insensitive to interference.

It is a yet further object of the invention to facilitate a simple signal processing of signals generated by the accelerometer.

SUMMARY OF THE INVENTION

The invention achieves these objectives in that, inside the inertial mass, there is at least one light source, the light from which, through at least one hole in the inertial mass, strikes at least one photo element located on the inner wall of the housing.

Such an accelerometer is mechanically sturdy and, as a result of the use of the digital principle, possible sources of interference are kept at a minimum.

According to another important characteristic, corresponding to a hole, there are several photo elements arranged in the direction of motion at a distance from one another.

The light source is routed through a single hole, so that when the beam of light strikes the corresponding photo element, a digital signal is produced by means of an electronic encoder system, corresponding to the acceleration responsible for the excursion in question.

One particularly advantageous embodiment provides that when several photo elements arranged on a reference circle are used, there are several groups of several holes at some distance from one another and approximately at right angles to the photo elements, whereby the group of holes are arranged in straight lines running parallel to one another. In such an embodiment, a digital word is produced, for example, by an electronic counter stage.

In one configuration of the invention, there is a photo element for each group of holes, and by an appropriate arrangement of the holes in each group, a direct digital resolution of the signals is possible. By means of an appropriate arrangement of the hole of a group at intervals and a photo element which corresponds to each group, a variable digital word can be formed, corresponding to the number of groups of holes.

As a function of the number of groups of holes, a digital word can be formed with a corresponding number of digits. Such digital words can be processed directly in a subsequent electronic system, so that interference from outside sources and the time and effort required for evaluation can be reduced to a minimum.

In one configuration of the invention, the mass exhibits a spring on each end in the direction of motion, which serves as the power feed for the light source.

An important characteristic of the invention is that the mass, on each end in the direction of motion, exhibits an electrically-conducting and mechanically flexible substance, by means of which power is fed to the light source.

BRIEF DESCRIPTION OF THE DRAWINGS

The above, as well as other features and advantages of the present invention, can be more readily appreciated through consideration of the detailed description of preferred embodiments in conjunction with the drawings, in which:

FIG. 7 shows schematically a cross section of the accelerometer illustrated in FIG. 4 with electronic circuitry attached thereto.

DESCRIPTION OF THE PREFERRED EMBODIMENTS

Figure 1:
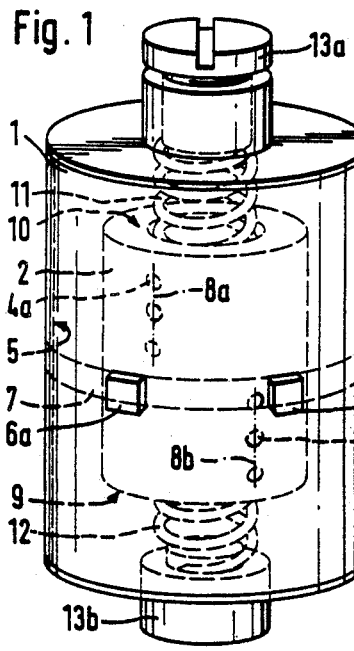
FIG. 1 shows schematically an accelerometer in cross section with two groups of holes and two photo elements.

The accelerometer illustrated in FIG. 1 comprises essentially a preferably cylindrical housing 1 and a cylindrical inertial mass 2 fastened to springs 11 and 12, which housing 1 is moved out of position under the influence of an external force. When an external force moves the housing 1, the inertial mass 2 is restrained by its inertia and then subsequent to acceleration, returns to a neutral position by action of the springs 11 and 12. The inertial mass 2 may move in either direction within the housing 1. The inertial mass 2 is provided with a group of holes 4a and another group of holes 4b. Three holes are shown in each group of holes 4a and 4b, for convenience, by any number of holes could be used for increased resolution. There is a light source 3 corresponding to the holes 4a and 4b. In the housing 1, there are photo elements 6a and 6b opposite each group of holes 4a and 4b. The housing 2 has an inner wall 5 into which the inertial mass 2 fits and moves within. A reference circle 7 represents a neutral position in the middle of the housing 1 along which the photo elements 6a and 6b are mounted. A number of orifices 8a are aligned with and move past the photo element 6a, thereby illuminating the photo element 6a as the inertial mass 2 moves within the housing 1. A second number of orifices 8b are aligned with and move past the photo element 6b, thereby illuminating the photo element 6b as the inertial mass 2 moves within the housing 1.

Within two ends 9 and 10 of the inertial mass 2, springs 12 and 11, respectively, are inserted in holes in the ends 9 and 10. The springs 11 and 12 preferably conduct electricity and provide the light source 3 with electricity for the lighting thereof. The ends of the springs 11 and 12, which are opposite the inertial mass 2, are held in terminals assemblies with spring adjustments 13a and 13b. Electrical connectors can also be connected to the spring adjustments 13a and 13b in order to provide electricity for the light source. Alternatively, other connections can be made to the light source 3 by the use of flexible wires, as are well known in the prior art.

The spring adjustments 13a and 13b can adjust the springs 11 and 12 to determine a fundamental frequency of the combination of the springs 11 and 12 and the inertial mass 2, such that the fundamental frequency can be adjusted to be within a specified range.

The size, thickness, length, and shape of the springs 11 and 12 are chosen for appropriate movement of the inertial mass 2 within the housing 1.

The evaluation is done via an electronic counter stage (shown in FIG. 7) which produces a digital word, which can be processed directly.

Figure 2:
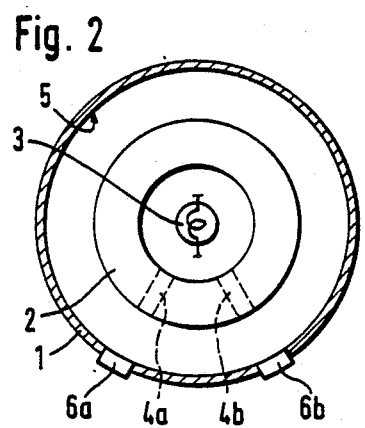
FIG. 2 shows schematically a cross section of the accelerometer illustrated in FIG. 1.

The overhead view shown in FIG. 2 shows the inertial mass 2, which is suspended in the housing 1, and whereby the light from the light source 3 reaches the photo elements 6a and 6b via the holes 4a and 4b. The light source 3 is preferably a low voltage, heavy filament light compatible with 12 volt operation, such as an elongated filament, cylindrical light bulb found in automobiles, but may be any appropriate light bulb. The outside surface of the inertial mass 2 facing the inner wall 5 of the housing 1 is disposed a given distance in the order of somewhat less than a millimeter to a few millimeters in order to assure that the inertial mass 2, if vibrationally excited radially, will not collide with the inner wall 5 and distort readings of the photo elements and will not have at least the kinetic energy of the cylindrical inertial mass 2 dissipated by collisions as the inertial mass 2 moves back and forth longitudinally.

Figure 3:
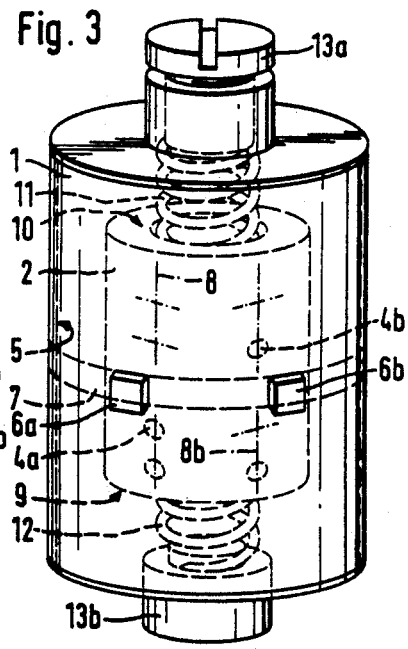
FIG. 3 shows schematically another embodiment of an accelerometer with two groups of holes and two photo elements for the direction formation of a digital word.

FIG. 3 shows another embodiment of an accelerometer, whereby the inertial mass 2 again exhibits two groups of holes 4a and 4b, which are arranged one behind the other in the direction of movement. Thereby, when the inertial mass 2 has a cylindrical shape, the holes of each group are located next to one another on a generatrix and the signal from the light source 3 is received either in two holes located next to one another, one hole of the first group and no hole in the second group, one hole in the second group and no hole in the first group, or no holes on a generatrix, thereby forming any appropriate digital code, well known in the prior art. The photo elements 6a and 6b thereby either both receive a light signal, or the photo elements 6a and 6b receive only one light signal each, or neither photo element 6a or 6b receive a light signal. This again results in the formation of a digital word, which can be processed directly. In this embodiment, no electronic evaluation system is necessary, since the light signals directly represent a corresponding position of the inertial mass 2. The reference numerals of like parts of FIG. 3 are the same as those of FIG. 1.

FIG. 4 again shows the inertial mass 2 in an overhead view, in the center of which is the light source 3, and the holes 4a and 4b allow the photo elements 6a and 6b to receive a corresponding beam of light.

Figure 5:
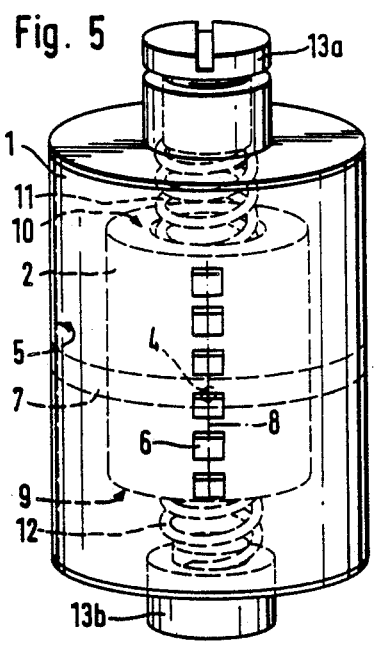
FIG. 5 shows schematically an accelerometer with one hole and several photo elements in cross section.

FIG. 5 shows a variant of an accelerometer, in which there is a single hole 4 in the mass 2, so that the light from the light source 3 located inside the inertial mass 2 can strike a different photo element 6 of the housing 1. The photo elements 6 are arranged at an interval one behind another in the direction of movement, and the position of the inertial mass 2 can be determined as a function of which photo element 6 is struck by the light source 3. The power feed to the light source 3 preferably travels via the springs 11 and 12, and the inertial mass 2 can be calibrated or adjusted by means of an adjusting screw 13. The reference numerals of like parts of FIG. 5 are the same as those of FIG. 1.

Figure 4:
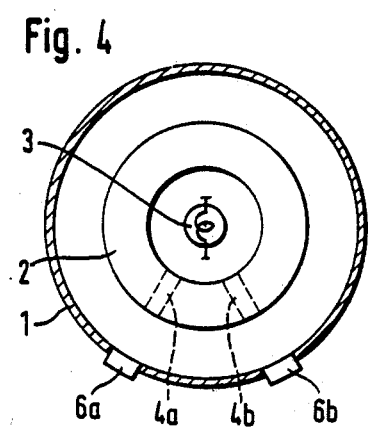
FIG. 4 shows schematically a cross section for the accelerometer illustrated in FIG. 3.
Figure 6:
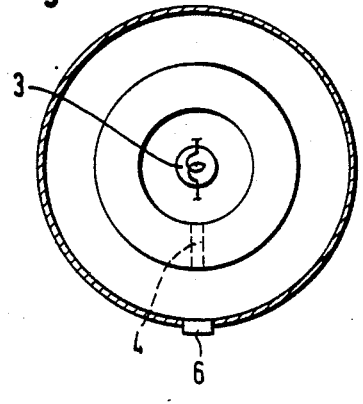
FIG. 6 shows schematically a cross section of the accelerometer illustrated in FIG. 5.

FIG. 6 shows the embodiment of FIG. 4 in an overhead view with the inertial mass 2, whereby the light from the light source 3 travels through the single hole 4 to the photo elements 6 arranged one adjacent or behind the other, and the position of the inertial mass 2 can thereby be determined.

FIG. 7 shows FIG. 4 with a digital processor 15 connected by lead pairs 17 and 19 to the photo elements 6a and 6b, respectively, which digital processor 15 generates a acceleration signal at an output 31. The digital processor 15 comprises a digital decoder 21, up and down counter circuits 23 for determining distance of displacement of the inertial mass 2 within the housing 1, difference circuits 25 for determining velocity of movement of the accelerometer, and second difference circuits 27, for determining acceleration. The outputs of circuits 23, 25 and 27 are connected to a mass spring system calculator 29 for converting these outputs to true acceleration and velocity of the housing 1.

The embodiments of the invention preferably have digital decoding circuitry connected to the photoelectric elements in order to generate digital signals from the photoelectric element signals, which digital signals are related to the back and forth movement of the inertial mass and its position within the housing.

The digital processor 15 comprises digital decoding circuitry, including circuits 21–29, connected to the photo elements 6a and 6b to generate digital signals from signals generated by the photo elements 6a and 6b, which photoelectric signals are related to the back and forth movement of the mass 2.

The invention as described hereinabove in the context of the preferred embodiments is not to be taken as limited to all of the provided details thereof, since modifications and variations thereof may be made without departing from the spirit and scope of the invention.

What is claimed is:

1. A digital signal accelerometer for measuring acceleration, said accelerometer comprising:
   a housing with an inertial mass disposed to move within said housing under acceleration of said housing;
   a source of light disposed within and moving with said mass;
   means for suspending said mass for movement within said housing and for permitting said mass to move back and forth within said housing during use when acceleration is being measured;
   means for conducting light from said light source from an interior portion to an exterior portion of said mass; and
   said housing having photoelectric sensing means disposed to selectively receive light from said light source through said light conducting means and generate at least one digital signal as said mass moves back and forth within said housing; and
   wherein said light conducting means comprises a plurality of holes disposed in said mass and said photoelectric means comprises a plurality of photoelectric elements, each of said plurality of photoelectric elements having a number of said holes for impining light thereto, each of said photoelectric elements being aligned to receive light from its corresponding holes.

2. The digital signal accelerometer according to claim 1, wherein said light conducting means comprises a sole light conductor.

3. The digital signal accelerometer according to claim 1, wherein said suspension means comprises springs connected to said mass and said housing for suspending said mass for movement within said housing.

4. The digital signal accelerometer according to claim 3, wherein said plurality of holes are aligned in straight lines along the back and forth movement of said mass.

5. The digital signal accelerometer according to claim 4, wherein there is one of said photoelectric elements for each aligned group of said holes.

6. The digital signal accelerometer according to claim 1, including a digital decoding circuitry connected to said photoelectric sensing means to generate digital signals from signals generated by said photoelectric sensing means, which photoelectric signals are related to the back and forth movement of said mass.

7. The digital signal accelerometer according to claim 2, including a digital decoding circuitry connected to said photoelectric sensing means to generate digital signals from signals generated by said photoelectric sensing means, which photoelectric signals are related to the back and forth movement of said mass.

8. The digital signal accelerometer according to claim 3, including a digital decoding circuitry connected to said photoelectric sensing means to generate digital signals from signals generated by said photoelectric sensing means, which photoelectric signals are related to the back and forth movement of said means.

9. The digital signal accelerometer according to claim 4, including a digital decoding circuitry connected to said photoelectric sensing means to generate digital signals from signals generated by said photoelectric sensing means, which photoelectric signals are related to the back and forth movement of said mass.

10. The digital signal accelerometer according to claim 5, including a digital decoding circuitry connected to said photoelectric sensing means to generate digital signals from signals generated by said photoelectric sensing means, which photoelectric signals are related to the back and forth movement of said mass.

11. The digital signal accelerometer according to claim 6, including acceleration circuitry for determining acceleration of said mass, said acceleration circuitry being connected to said digital decoding circuitry.

12. The digital signal accelerometer according to claim 1, wherein said mass has an end surface at each end thereof and said suspension means comprises two springs making connection with said end surfaces and also making electrical connection with said light source for providing electric power thereto.

13. The digital signal accelerometer according to claim 1, wherein said suspension means comprises electrically conductive and mechanically elastic means for feeding electric power to said light source.

14. The digital signal accelerometer according to claim 2, wherein said suspension means comprises electrically conductive and mechanically elastic means for feeding electric power to said light source.

15. The digital signal accelerometer according to claim 3, wherein said suspension means comprises electrically conductive and mechanically elastic means for feeding electric power to said light source.

16. The digital signal accelerometer according to claim 6, wherein said suspension means comprises electrically conductive and mechanically elastic means for feeding electric power to said light source.

17. The digital signal accelerometer according to claim 11, wherein said suspension means comprises electrically conductive and mechanically elastic means for feeding electric power to said light source.

18. A digital signal vibration sensor comprising:
- a housing with an inertial mass being disposed to move and to substantially translate therein;
- a source of light disposed within and moving with said mass;
- means for suspending said mass for movement within said housing and for permitting said mass to move back and forth within said housing during use when vibration is being sensed;
- means for conducting light from said light source from an interior portion to an exterior portion of said mass; and
- said housing having photoelectric sensing means disposed to selectively receive light from said light source through said light conducting means and generate a plurality of digital signals as said mass moves back and forth within said housing; and
- wherein said light conducting means comprises a plurality of holes disposed in said mass and said photoelectric means comprises a plurality of photoelectric elements, each of said plurality of photoelectric elements having a number of corresponding holes for impinging light thereonto, each of said photoelectric elements being aligned to receive light from its corresponding holes.

* * * * *